United States Patent [19]

Petzow et al.

[11] Patent Number: 4,904,623
[45] Date of Patent: Feb. 27, 1990

[54] MOLDED METAL CARBIDE-BORIDE REFRACTORY PRODUCTS

[75] Inventors: Günter Petzow, Leinfelden-Echterdingen; Heinrich Hofmann, Gerlingen; Kurt Weiss, Vaduz, Liechtenstein, all of Fed. Rep. of Germany

[73] Assignee: Max-Planck-Gesellschaft zur Forderung der Wissenschaften e.V., Munich, Fed. Rep. of Germany

[21] Appl. No.: 228,811

[22] Filed: Aug. 2, 1988

Related U.S. Application Data

[60] Continuation-in-part of Ser. No. 19,481, Feb. 26, 1987, abandoned, which is a division of Ser. No. 777,230, Sep. 18, 1985, Pat. No. 4,670,408.

[30] Foreign Application Priority Data

Sep. 24, 1984 [DE] Fed. Rep. of Germany ....... 3435345

[51] Int. Cl.$^4$ ..................... C04B 35/56; C04B 35/58
[52] U.S. Cl. ........................................ 501/96; 501/87; 75/238; 75/244
[58] Field of Search ................... 75/238, 244; 501/93, 501/96, 98, 87

[56] References Cited

U.S. PATENT DOCUMENTS

| | | | |
|---|---|---|---|
| 3,749,571 | 7/1973 | Stibbs et al. | 501/96 X |
| 3,859,399 | 1/1975 | Bailey et al. | 501/93 X |
| 4,029,000 | 6/1977 | Nakamura et al. | 501/87 X |
| 4,512,946 | 4/1985 | Brun et al. | 501/96 X |
| 4,539,299 | 9/1985 | Brun et al. | 501/960 |

*Primary Examiner*—Mark L. Bell
*Assistant Examiner*—Karl Group
*Attorney, Agent, or Firm*—Toren, McGeady & Associates

[57] ABSTRACT

Boron carbide/transition metal boride molded articles produced by hot pressing a mixture of from 25 to 75% by weight of boron carbide, from 14 to 40% by weight or boron, from 10 to 50% by weight of tungsten and/or titanium carbide, from 0 to 6% by weight of cobalt and from 0 to 8% by weight of silicon to convert the carbide into the corresponding boride.

11 Claims, No Drawings

MOLDED METAL CARBIDE-BORIDE REFRACTORY PRODUCTS

This application is a continuation-in-part of application Ser. No. 07/019,481, filed Feb. 26, 1987, now abandoned, which is a divisional of application Ser. No. 06/777,230, filed Sept. 18, 1985, now U.S. Pat. No. 4,670,408.

BACKGROUND OF THE INVENTION

1. Field of the Invention

The invention relates to high hardness materials containing borides.

2. Description of the Prior Art

Mixtures, alloys, or ceramic materials, which contain carbides, such as, boron carbide, borides, such as, chromium boride, zirconium boride, titanium boride, molybdenum boride, tantalum boride, tungsten boride, and vanadium boride, optionally in addition to nitrides, are known. These materials have a very high hardness and can be used, for example, as sand blasting jets, for the treatment of abrasive disks, and for the preparation of objects which are subject to other, appreciable stresses. It is well known that alloys and mixtures based on boron carbide have very good material wear properties; yet, they are not satisfactory in respect to some material properties (Powder Metallurgy International, 1983, vol. 5, 201-205). This is true also for those boron carbide materials, which contain additional components, such as, borides and/or nitrides.

SUMMARY OF THE INVENTION

It is an object of the present invention to provide a process which makes accessible boron carbide materials with completely satisfactory properties, which can be used for purposes of high stress, especially as molded articles.

This is accomplished, in accordance with the present invention, by intimately contacting a finely particulate boron carbide with boron and a transition metal carbide and hot pressing the resulting powder to produce a molded article.

DESCRIPTION OF THE PREFERRED EMBODIMENT

The finely particulate or finely grained boron carbide used in the process generally has a particle size in the range of 0.5 to about 50 μm and, preferably, in the range of from 1 to 10 μm. While $B_4C$ is preferred, other boron carbides may be used in the process. It has also proven to be advantageous to use the boron in finely particulate form, and especially in an amorphous form.

The intimate contact, which is required inventively, is brought about by mixing. For this purpose, conventional mixing devices, such as, stirring devices, asymmetrically moved mixers, and the like can be used.

It has proven to be particularly advantageous to carry out the intimate mixing in the presence of silicon and/or cobalt, and especially in the presence of metallic silicon in finely divided form.

It is particularly advantageous to use a tungsten carbide and/or titanium carbide as the transition metal carbide. In implementing the process, WC and/or TiC are regularly preferred.

The mixing process can be aided significantly by attrition. In this case, the process is carried out with balls of a transition metal carbide and cobalt, such as, WC-Co or WC-TiC-Co. The cobalt, which acts above all as a process aid, can be introduced in this manner into the process in the form of an alloy with the transition metal carbides. The hard metal alloy balls generally have a diameter in the range of 0.5 to 5 mm and, preferably, in the range of about 1 to 2 mm. It has proven to be advantageous in this connection to work in the attritor with a tungsten carbide/cobalt or a tungsten carbide/titanium carbide/cobalt hard metal stirrer.

Organic solvents suitable for use in the attrition process include inert media, such as, saturated hydrocarbons, particularly, an aryl hydrocarbon benzene, as well as alcohols, such as, aliphatic $C_1$-$C_5$ alkenols and especially propanol.

Even though tungsten carbide and/or titanium carbide are much preferred for implementing the process, these carbides can be replaced, at least partially, by other transition metal carbides such as, zirconium carbide, chromium carbide, or tantalum carbide.

Although the sequence of the mixing operation does not appear to be critical, it has nevertheless proven to be successful to mix first of all the boron carbide powder with boron and silicon. The powder together with the transition metal carbide is then comminuted. Tungsten carbide and cobalt, or tungsten carbide, titanium carbide, and cobalt are preferred. The process can optionally be carried out in the presence of an organic solvent.

It has proven to be particularly successful to conduct the comminuting-mixing process to a boron-carbide particle size of less than 1 μm. Moreover, mixtures can be prepared which contain boron carbide particles of 0.1-0.5 μm or even smaller particles as an essential component.

For implementing the process, mixtures of
- 25-75 weight percent boron carbide,
- 15-40 weight percent boron,
- 0-8 weight percent silicon,
- 10-50 weight percent tungsten and/or titanium carbide,
- 0-6 weight percent cobalt are preferred. Moreover, the amount of boron should be such that is suffices at least for converting the introduced transitional metal carbide into the corresponding boride and, preferably, also for binding the carbide carbon set free. The silicon and cobalt both react with boron in the temperature range of 900°-1100° C. forming binary silicon borides, cobalt borides or ternary Si-Co-B compounds accompanied by a reduction in the melting temperature. It is essential for the production process that a liquid phase forms above approximately 1000° C., which acts to lubricate the particle rearrangement during hot pressing.

Silicon and cobalt borides tend to evaporate at the relatively high temperature of 1820° C. On the basis of weight loss measurements, it is estimated that about 80 weight percent of the silicon and cobalt additives are lost during the densification process. The residual silicon and cobalt may appear in the finished product as boron carbide solid solution [$B_{12}(B, C, Si)_3$], as silicon carbide, as free silicon with dissolved cobalt and boron, or as cobalt silicides of several stoichiometries, with or without boron content.

Boron carbide generally reacts with transition metal carbides according to the formula:

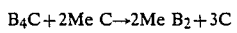

$$B_4C + 2Me\ C \rightarrow 2Me\ B_2 + 3C$$

Additional boron is therefore required in order to bind the released carbon:

$$12B + 3C \rightarrow 3B_4C$$

This results in the net reaction:
$$12B + 2MeC \rightarrow 2MeB_2 + 2B_4C$$

As a result, both boron carbide and free boron react with transition metal carbides. Which of these reactions which actually takes place depends on the juxtaposition of the particular grains. It is generally impossible to estimate the volume fraction of reacting boron carbide. It is, however, essential for the process and thus for the properties of the sintered product that (a) grain size refinement in the resulting product is achieved by decomposition of the initial $B_4C$ or by the formation of new $B_4C$, (b) the transition metal carbide decomposes completely by one or both of the reactions detailed above, and (c) free carbon released from the first reaction is completely removed by being bound by free boron.

Elemental silicon is used as a starting material. As mentioned above, elemental silicon preferentially evaporates during sintering or reacts to form the compounds described above. Elemental silicon with dissolved cobalt and/or boron may still be present after sintering but this is not claimed to be an essential feature of the disclosed products since the reaction leading to carbides or borides is preferred. These products have surprisingly good properties and are virtually free of transitional metal carbides and uncombined carbon. During the reaction of boron with the transitional metal carbides to form the transition metal borides, free carbon is generated which reacts with any excess boron to yield boron carbide. The silicon and cobalt used in the reaction are process assist materials and do not influence the properties of the final product.

If the product obtained is to be converted into molded articles by pressing the powder at an elevated temperature, that is, by conventional powder metallurgical means, the hot pressing is carried out in a vacuum or in an inert gas atmosphere, especially a noble gas atmosphere. A cold, isostatic preconsolidification of the intimate mixture can precede such a hot pressing operation. The hot pressing operation itself is generally accomplished at temperatures between 1550° and 1850° C.

The inventive molded articles are composed of alloys containing boron carbide/tungsten boride and/or titanium boride, obtained by one of the preceding processes. In particular, these include molded articles produced by the powder metallurgical method, especially cutting tools, such as, cutting-alloy tips and the like, which are characterized by a content of 66-85 volume percent of boron carbide and 34-15 volume percent of transition metal boride.

The preferred transition metal boride is tungsten boride or tungsten boride and titanium boride. The volume ratio of tungsten boride to titanium boride preferably is 3:1 to 2:1. Molded particles, containing 72 volume percent of boron carbide and 28 volume percent of transition metal boride, and especially the aforementioned transition metal boride, have proven to be particularly successful.

Materials of the inventive type are frequently also referred to as ceramic materials or hard metal alloys. The inventively produced molded articles can be used especially as materials for the construction of wearing parts, especially cutting tools, and particularly those for cutting rock or for metal working processes, as well as for armor-plating and the like. In the inventively produced products, the carbidic phase is regularly present as $B_4C$, while the boridic phase, when tungsten carbide and titanium carbide are used, is regularly present as $W_2B_5$ or $TiB_2$.

EXAMPLE

57% by weight boron carbide powder (1-7 μm), 35.5% by weight amorphous boron (95%), and 7.5% by weight finely particulate silicon are mixed for one hour in an asymmetrically moved mixer. 40 g of this mixture is pulverized in propanol in an attritor with 3 kg of hard metal balls (tungsten carbide/cobalt or tungsten-/titanium carbide/cobalt) and a hard metal stirrer (1,000 rpm). The pulverizing time is 4 hours at the most. The attritioned powder is then separated from the propanol in a rotary evaporator and dried.

The powder is now ground in a WC-Co ball mill and screened to remove the coarse agglomerate, which has not disintegrated during the grinding process (mesh size of the screen: 0.15 mm). Tablets are produced in a press with an uniaxial bottom die and can be post-consolidated isostatically in the cold, for example at 635 MPa. The hot pressing is carried out under vacuum. The bottom die consists of graphite, which is coated with boron nitride in order to prevent a reaction between the powder and the graphite. It is subjected to a load of 25 MPa, heated to 1,000° C. and kept for 45 minutes at this temperature. The pressure is subsequently increased to 35 MPa and the temperature raised at the rate of 45° K/min to 1,800° C. and held at this temperature for 3 minutes. Subsequently, the temperature is lowered within 5 minutes to below 1,000° C., the pressure being reduced to 10 MPa.

What is claimed is:

1. Multiphase hard metal alloy articles consisting essentially of 65-85 volume percent of boron carbide and 34-15 volume percent of tungsten boride, or a combination of tungsten boride and titanium boride in a volume ratio of 3:1 to 2:1 produced by the process comprising intimately contacting a mixture of from 25 to 75% by weight of finely divided boron carbide, from 15 to 40% by weight of amorphous boron, from 10 to 50% by weight of tungsten carbide or a combination of tungsten carbide and titanium carbide, from 0 to 6% by weight of cobalt, and from 0 to 8% of finely particulate elemental silicon, and hot pressing the powder so obtained at between 1550° C. and 1850° C.

2. The articles of claim 1, wherein said boron carbide has a particle size in the range of 0.5 to 50 microns.

3. The articles of claim 1, wherein said boron carbide has a particle size in the range of from 1 to 10 microns.

4. The articles of claim 1, wherein said contacting includes an attrition step carried out with metal alloy balls having a diameter in the range of 0.5 mm to 5.0 mm.

5. The articles of claim 4, wherein said balls have a diameter in the range of about 1 to 2 mm.

6. The articles of claim 4, wherein the attrition step is carried out in the presence of an inert organic solvent.

7. The articles of claim 6, wherein said inert organic solvent is selected from the group consisting of saturated hydrocarbons, and alcohols.

8. The articles of claim 1, wherein the tungsten carbide or tungsten carbide and titanium carbide are converted to the corresponding boride during the hot pressing.

9. The articles of claim 1, wherein the amount of boron is sufficient to convert the tungsten carbide or tungsten carbide and titanium carbide into the corresponding boride.

10. The articles of claim 1, wherein the amount of boron is sufficient to convert the tungsten carbide or tungsten carbide and titanium carbide into the corresponding boride and to bind freed carbon.

11. The articles of claim 1, wherein the resultant product is free of tungsten carbide or tungsten and titanium carbide and free carbon.

* * * * *